3,149,041
THIN FILM COATING FOR TABLETS AND THE
LIKE AND METHOD OF COATING
Sampson F. Jeffries, Indianapolis, Ind., assignor to The
Dow Chemical Company, Midland, Mich., a corporation of Delaware
No Drawing. Filed Apr. 9, 1962, Ser. No. 185,864
4 Claims. (Cl. 167—82)

This invention relates to tablets and other individual dosage forms which are characterized by a thin film coating of a water-permeable plastic composition, and to the method of coating such tablets and dosage forms. The invention also relates to an improved, thin, water-permeable tablet coating film, and to a liquid composition useful for laying down the aforementioned film.

Various film coatings have been employed heretofore, but each of the known coatings tends to leave something to be desired. Some coating compositions deposit too little material and build-up is very slow. Other coatings mask embossing or score marks on tablets, make the tablets too tacky during drying, or do not form a smooth, adherent coat on the tablets. More specifically, in the coating of tablets with a coating consisting mainly of polyethylene glycols having molecular weights in the range of 3000 to 7500, the difficulty encountered is that the polyethylene glycol coating is too soft and abrades away under the friction of the load in a production-size batch in a large drying pan. It is, therefore, a principal objective of the present invention to overcome the difficulties encountered in using the known coating compositions, and to provide an improved coating which is smooth, tough and resilient and which is not subject to rapidly destructive abrasion in the coating pan.

According to the present invention, there is now provided a tablet coating composition which is comprised of a major portion of a water-soluble polyethylene glycol having a molecular weight in the range of about 3000 to 7500, and a relatively smaller portion of a copolymer of N-vinyl-5-methyl-2-oxazolidinone and vinyl acetate. Several other ingredients may be added to the previously-named ingredients in order to enhance the properties of the coating obtained from the composition. Among the more important of these additional materials are plasticizing agents, opaquing agents and coloring agents.

The polyethylene glycols used in the present composition are polymers each of which is a polyethoxy dihydric alcohol having a molecular weight in the range of about 3000 to 7500. These polymers are white, waxy solids which are soluble in water, as well as in many of the more polar, non-aqueous solvents, or in mixtures of the more polar solvents with non-polar organic solvents. They have freezing points in the range of about 50–65° C. Several particularly suitable polymers are available. One is sold as Polyglycol E–6000. Two others are sold under the trademark Carbowax and are designated, respectively, as "Carbowax 4000" and "Carbowax 6000." In these names, the numeral indicates the approximate molecular weight of the polymer. Of these polymers, Polyglycol E–6000 and Carbowax 6000 are to be preferred as providing the more abrasion-resistant coating.

The copolymer of N-vinyl-5-methyl-2-oxazolidinone and vinyl acetate may be represented by the following structural formula:

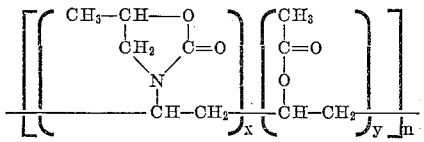

The ratio of the molecular moieties (here $x:y$) may vary from 3:1 to 1:3 in various species of this copolymer, but is preferably about 2:3. The degree of polarization of the copolymer is such as to yield a K value of 15±5. K is determined by the relationship $$\text{Log } \eta \text{ rel.} = \frac{0.000075 K^2}{1+0.0015 K}+0.001 K$$

where the relative viscosity ($\eta$ rel.) is measured for a 1 percent (1 gram per 100 ml.) solution of the copolymer in 50:50 (weight percent) methanol and water (H. Fickentscher, Cellulosechemie 13, 58 (1932). A particularly suitable form of the copolymer for the present invention is sold as Devlex A–515. In Devlex A–515 copolymer, the quantities $x$ and $y$ in the above structural formula are, respectively, 2 and approximately 3.

The copolymer of N-vinyl-5-methyl-2-oxazolidinone and vinyl acetate is a white, waxy, free-flowing powder. It is capable of yielding films which are hard, clear and which possess a very low hygroscopicity. The copolymer is readily soluble in solvents such as methanol and 95 percent (aq.) ethanol, methylene chloride, 1,4-dioxane, acetone and methyl ethyl ketone; but it is of limited solubility in solvents such as ethanol, chloroform, hexane, ethylene glycol and water. The solubility in water is about 1.2 grams per 100 grams of water at ambient room temperature.

Suitable plasticizing agents include plasticizers which are also physiologically acceptable, such as diethyl phthalate, castor oil, corn oil, sesame oil, and propylene glycol, as well known in the art. A particularly suitable plasticizing agent is a combination of about 1 part of diethyl phthalate per 2 parts of castor oil.

Among the coloring agents which may be used in the practice of this invention are any of the non-toxic dyes, lakes and pigments which can be dissolved in, or otherwise dispersed in, the solvent employed in the coating composition, and which have been certified for use in the food, drug and cosmetic industries as D. and C., or F. D. and C. colorants. For example, it has been found that dyes of the type represented by red F. D. and C. #3, green F. D. and C. #2, yellow F. D. and C. #5, violet F. D. and C. #1, red D. and C. #35, orange D. and C. #17 and green D. and C. #6 are suitable for use as colorants in the coating composition. Among the pigments which are suitable are Mapico Yellow AN–1 (yellow hydrated iron oxide), Mapico Brown AN–18 (brown hydrated iron oxide), Mapico Red AN–3 (red iron oxide) and Raven #15 Black (carbon black).

Many lakes are found suitable in the practice of this invention. A lake is a dye which has been precipitated on an insoluble metal compound. To meet Food and Drug Administration requirements, it is necessary to deposit one of the acceptable dyes on a pharmaceutically acceptable carrier such as aluminum hydroxide. As an example, F. D. and C. Red #3 may be deposited on aluminum hydroxide.

When the tablet coating composition is applied according to the process of the invention, it is possible to provide a suitable coating for a tablet or the like with the use of a relatively few coats or applications of the coating material. Highly important advantage of this invention, as indicated hereinabove, is that the coating does not abrade off of the tablets in an uneven, unsatisfactory manner during the tumbling of a production batch of tablets in a coating pan during the coating process. The initial coats applied to dosage forms using the present composition, produces a smooth coating which is not chipped or abraded off while tumbling the dosage forms during the drying period between the application of new coats. As a consequence, a smooth, handsome coated tablet or other dosage form is readily obtained. Usually, a thinner build-up of multiple coats suffices to give adequate coverage of the dosage forms, since edges or corners receive and retain a full coat at each application. This results in important savings in time and materials. Hence, it is possible to completely coat a tablet in a matter of minutes with an average of from about six to eight coatings, though more coats may be used if desired.

Even when the coating composition claimed herein is applied without coloring agent, a tablet of pleasing appearance is obtained having a colorless coating. An opaque coating may be obtained by the addition of a quantity of titanium dioxide to the composition, if desired, as by triturating or milling the requisite amount with the coating composition. Examples of other opaquing agents are: Calcium carbonate, precipitated, U.S.P., and kaolin, N.F.

The invention is most highly suitable, however, to the application of colored film coatings of the type described in which a small quantity of a suitable coloring agent, such as the dyes, pigments and lakes previously set forth, or a mixture thereof with an opaquing agent, is incorporated into the solution prior to application on the tablets. In this manner, a highly pleasing appearance is given to the tablets and the tablets may be regarded as "elegant" in the terms of the trade. The film of this invention very effectively coats the tablets so that no unpleasant taste can be perceived, but at the same time, distinctive markings punched into the tablet core will show through very clearly and be readily discernible on the surface.

In carrying out the process of the present invention, the coating composition is conveniently first prepared as two separate solutions. The first solution consists of the water-soluble polyethylene glycol dissolved in a suitable volatile, non-aqueous solvent such as alcohol, acetone, methyl ethyl ketone, ethyl acetate, methylene dichloride or benzene, or a mixture of any of the foregoing, such as alcohol (ethanol) and acetone mixed in proportions of about 1:1, or a mixture of one of these with yet another volatile, organic solvent. About a 45 to 55 percent w./v. solution is prepared, preferably about a 50 percent w./v. solution. Usually about a 4 to 7 percent w./v. of a plasticizing agent, consisting of one or more plasticizers, is added to this solution.

The second solution consists of the copolymer of N-vinyl-5-methyl-2-oxazolidinone and vinyl acetate dissolved in a suitable volatile, non-aqueous solvent such as acetone or a 1:1 (w./w.) mixture of acetone and ethanol. The solvent used in preparing this solution must be miscible with the solvent used for the first solution, and further, must not form a mixture with the solvent of the first solution, in which the requisite amount of polyethylene glycol is insoluble. Therefore, the preferred solvents are those selected from methyl alcohol, methylene chloride, acetone, methyl ethyl ketone and ethyl acetate. About a 23–27 percent w./v. solution of N-vinyl-5-methyl-2-oxazolidinone copolymer is prepared, preferably about a 25 percent w./v. solution.

In making up the composite fluid coating composition which is applied to the tablets or other dosage forms, mixtures of from 1 to 3 parts by volume of the solution of the polyethylene glycol per part by volume of the solution of N-vinyl-5-methyl-2-oxazolidinone copolymer are measured out and admixed.

The concentrations of the polyethylene glycol and the N-vinyl-5-methyl-2-oxazolidinone copolymer in their separate solutions may be varied only rather small ranges, since solutions appreciably more concentrated than those set for above tend to be quite viscous, while substantially more dilute solutions are of greatly diminished value in building up a film coating on tablets at an appreciable rate. However, within the limitations of the physical properties of the separate solutions, the concentrations in the separate solutions may be varied somewhat, providing the final composite fluid coating solution contains from about 25 to 37 percent w./v. of the water-soluble polyethylene glycol and from about 6 to 12.5 percent w./v. of the N-vinyl-5-methyl-2-oxazolidinone copolymer.

On a weight percent basis, the liquid tablet coating composition of the present invention contains from about 22 to 32 percent of the polyethylene glycol, from 5.5 to 11.5 percent of the N-vinyl-5-methyl-2-oxazolidinone copolymer and from about 2.5 to 3.5 percent of plasticizing agent. More preferably, the liquid coating composition contains about 29 percent by weight of the polyethylene glycol, about 7 percent of the N-vinyl-5-methyl-2-oxazolidinone copolymer and about 3.2 percent of plasticizing agent, and the balance volatile, non-aqueous solvent therefor.

The finished dry coating on the tablet contains from about 62 to 78 percent by weight of the water-soluble polyethylene glycol, from about 13 to 31 percent by weight of the N-vinyl-5-methyl-2-oxazolidinone, and from about 6.5 to 8.5 percent by weight of a plasticizer. Preferably, the coating contains about 73 percent by weight of the polyethylene glycol, about 18 percent by weight of the N-vinyl-5-methyl - 2 - oxazolidinone copolymer and about 7 percent by weight of a plasticizer. The percent by weight of additives such as colorants is quite small and usually does not exceed several percent by weight in total amount.

Colored compositions according to the invention may be prepared by admixing one or more of the acceptable coloring agents with the present composite coating solution. Suitable proportions of coloring agent and coating solutions are illustrated in tabular form.

| Coloring Agent | | Volume of Coating Solution, ml. | Method of Mixing |
|---|---|---|---|
| Kind | Weight, mg. | | |
| F.D. & C. Green #2 | 50 | 100 | Stir to dissolve. |
| F.D. & C. Yellow #11 | 50 | 100 | Mill or stir vigorously. |
| Aluminum Lake of F.D. & C. Red #3. | 100 | 100 | Triturate or ball mill. |
| Mapico Red AN-3 (iron oxide). | 200 | 100 | Do. |
| Titanium Oxide | 1,000 | | |

The expression "w./v." is used herein for its customary meaning as understood in the pharmaceutical industry. The expression "w./v." means weight per volume, i.e., the weight in grams of ingredients per 100 milliliters of suspension or solution.

The following examples serve to illustrate the present invention but are not to be construed as limiting thereof.

*Example 1*

A tablet coating solution is made up in 2 parts according to the following formula.

Solution A:
  Polyglycol E–6000 _ 60 grams.
  Castor oil _____ 4.5 milliliters (ca. 4.3 grams).
  Diethyl phthalate __ 2 milliliters (ca. 2.2 grams).
  Alcohol, q.s. _____ 120 milliliters (ca. 80 grams).

Solution B:
  Devlex A–515 polymer [1] _____ 25 grams.
  Acetone, alcohol (1:1 mixture by volume), q.s. _____ 100 milliliters (ca. 75 grams).

[1] Species of the copolymer containing about 2 units of the N-vinyl-5-methyl-2-oxazolidinone moiety per 3 units of vinyl acetate moiety in the polymer molecule.

120 milliliters of Solution A and 60 milliliters of Solution B are mixed and applied to a moving bed of about six pounds of 0.5 gram tablets held in a rotating coating pan. As the coating pan rotates, a small portion of the coating solution (for example, 30 milliliters) is poured rapidly onto the tablets. As the tablets tumble in the pan, the material is distributed evenly over the surface of the tablets. In a few minutes' time, the solvents evaporate, leaving a dry, hard film. A stream of warm air is then directed on the moving bed of tablets for several minutes. Thereafter, a second coat is applied in the same manner and subsequent coats are similarly applied until a total of six coats have been applied over a period of about 20 minutes. A short additional drying time of 20–30 minutes after removal of the tablets from the coating pan assures completion of drying and removal of residual solvent odors.

Tablets coated in this manner are pleasing in appearance, the coating is smooth, and the edges of the tablets are fully rounded and coated. Disintegration tests carried out on the so-coated tablets show that the film coating thereon will disintegrate in as short a time as 15–20 seconds in water or artificial gastric juices.

*Example 2*

In a manner similar to that described in Example 1, a composite fluid coating composition is prepared consisting of 120 milliliters of Solution A and 40 milliliters of Solution B. These quantities of Solution A and Solution B are mixed and applied to a moving bed of about 6 pounds of 0.6 gram tablets by pouring small portions onto the tablets until an average of about 8 coats have been applied, in the same manner as in Example 1.

The coated tablets present a smooth, pleasing appearance and show no evidence of chipping or abrading of any part of the coating.

*Example 3*

In a manner similar to that described in Example 1, a composite fluid composition is prepared consisting of 100 milliliters of Solution A and 100 milliliters of Solution B. These quantities of Solution A and Solution B are mixed and applied to a moving bed of about 8 pounds of 0.5 gram tablets by pouring small portions onto the tablets until about 7 coats have been applied in the same manner as described in Example 1.

The coated tablets present a smooth, pleasing appearance and show no evidence of chipping or abrading of any part of the coating.

The coating, coating solution and coating method of the invention having been described, various modifications thereof will be apparent to those skilled in the art, and the scope of the invention is to be considered limited only by the scope of the hereinafter appended claims.

I claim:
1. A fluid composition adapted for application to tablets and the like in the formation of a film coating thereon which consists essentially of: from 22 to 32 percent by weight of a water-soluble, polyethylene glycol having a molecular weight in the range of 3000 to 7500; from 5.5 to 11.5 percent of a copolymer of N-vinyl-5-methyl-2-oxazolidinone and vinyl acetate in which the relative proportion of the molecular moieties in the copolymer is in the range of from 1:3 to 3:1; from about 2.5 to 3.5 percent of a plasticizing agent; and from about 59 to 64 percent by weight of a volatile, non-aqueous solvent therefor.

2. A fluid composition adapted for application to tablets and the like in the formation of a film coating thereon which consists essentially of: about 29 percent by weight of a water-soluble polyethylene glycol having a molecular weight in the range of 3000 to 7500; about 7 percent of a copolymer of N-vinyl-5-methyl-2-oxazolidinone and vinyl acetate in which the relative proportion of the molecular moieties in the copolymer is in the range of from 1:3 to 3:1; about 3 percent of a plasticizing agent selected from the group consisting of diethyl phthalate, castor oil, corn oil, sesame oil, propylene glycol and a mixture consisting of one part of diethyl phthalate per two parts of castor oil; and about 60 percent by weight of a volatile, non-aqueous solvent therefor selected from the group consisting of ethyl alcohol, methyl alcohol, methylene chloride, acetone, methylethyl ketone and ethyl acetate.

3. A coated tablet having as the coating material a thin film consisting essentially of, by weight: 62 to 78 percent of a water-soluble, polyethylene glycol having a molecular weight in the range of 3000 to 7500; 13 to 31 percent of a copolymer of N-vinyl-5-methyl-2-oxazolidinone and vinyl acetate in which the relative proportion of the molecular moieties in the copolymer is in the range of from 1:3 to 3:1; and 6.5 to 8.5 percent of a plasticizing agent.

4. A coated tablet having as the coating material a thin film consisting essentially of by weight 73 percent of a water-soluble, polyethylene glycol having a molecular weight in the range of 3000 to 7500, 18 percent of N-vinyl-5-methyl-2-oxazolidinone and vinyl acetate, and 7 percent of a plasticizing agent.

References Cited in the file of this patent

UNITED STATES PATENTS

| | | |
|---|---|---|
| 2,818,362 | Drechsel | Dec. 31, 1957 |
| 2,881,085 | Endicott et al. | Apr. 7, 1959 |
| 2,957,804 | Shuyler | Oct. 25, 1960 |
| 2,991,226 | Millar et al. | July 4, 1961 |
| 3,030,273 | Zagnoli | Apr. 17, 1962 |
| 3,064,004 | Little | Nov. 13, 1962 |
| 3,065,130 | Walles | Nov. 20, 1962 |
| 3,079,396 | Walles | Feb. 26, 1963 |

FOREIGN PATENTS

| | | |
|---|---|---|
| 762,229 | Great Britain | Nov. 28, 1956 |
| 764,342 | Great Britain | Dec. 28, 1956 |

OTHER REFERENCES

Chapman et al.: "Physiological Availability of Drugs in Tablets," Canad. Med. Ass'n. J., volume 76, pages 102–106, January 15, 1957.

Drechsel: "N-Vinyl-2-Oxazolidone," Journal Organic Chemistry, volume 22, pages 849–851, July 1957.

Dragstedt: "Oral Medication With Preparations for Prolonged Action," J.A.M.A., volume 168, No. 12, pages 1652–1655, Nov. 22, 1958.

Lazarus et al.: "Oral Prolonged Action Medicaments: Their Pharmaceutical Control and Therapeutic Aspects," J. Pharm. and Pharmacol., volume 11, No. 5, pages 257–290 (pages 266–271, 277–279, and 285–288 are especially pertinent to In Vivo Tablet Avaliability of Drugs), May 1959.

Campbell et al.: "Oral Prolonged Action Medicament," Practitioner, volume 183, pages 758–765, December 1959.

Gross et al. "Transformulation to Filmcoating," Drug and Cosmetic Industry, volume 86, No. 2, pages 170–171, 264, 288–291, February 1960.